(No Model.)
A. IVERS.
WATER CLOSET HOPPER AND BOWL.
No. 382,089. Patented May 1, 1888.
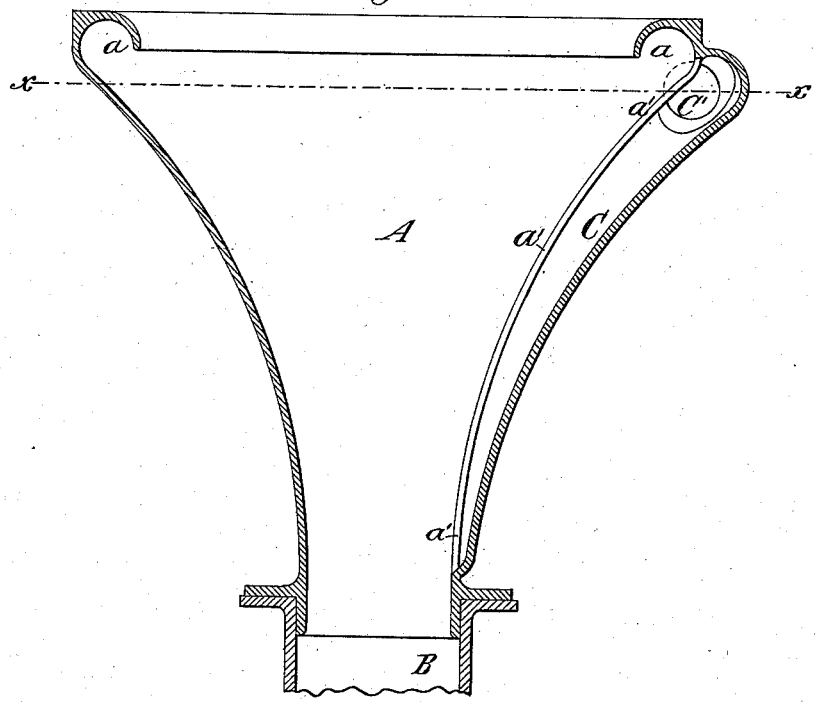
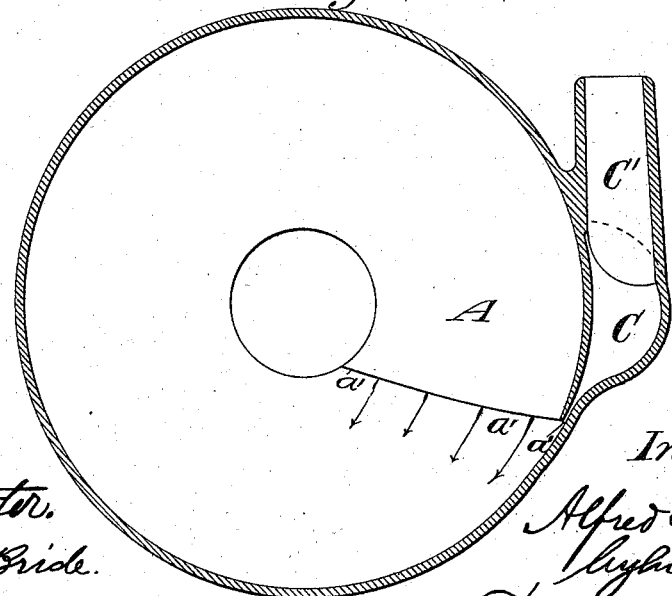
Witnesses.
Emil H. Center.
Henry J. McBride.
Inventor.
Alfred Ivers.
by his attys
Brown & Hall.
N. PETERS, Photo-Lithographer, Washington, D. C.

United States Patent Office.

ALFRED IVERS, OF NEW YORK, N. Y.

WATER-CLOSET HOPPER AND BOWL.

SPECIFICATION forming part of Letters Patent No. 382,089, dated May 1, 1888.

Application filed August 17, 1887. Serial No. 247,141. (No model.)

*To all whom it may concern:*

Be it known that I, ALFRED IVERS, of the city and county of New York, in the State of New York, have invented a new and useful Improvement in Water-Closet Hoppers and Bowls, of which the following is a specification.

My invention relates more particularly to what are known as "flushing-hoppers," in which no pan is employed, but the closet is cleaned by a copicus flow of water after each use; but the invention may be employed in bowls of ordinary pan-closets, if desired.

In hoppers of flushing-closets it has been common to provide around the top a circumferential supply channel or feeder which delivers its water downward through a series of openings arranged circumferentially around the bowl; but a serious objection to that construction is that the space between the holes or perforations through which the water is discharged from the supply channel or feeder are apt to become dirty, and if they do they remain so.

The object of my invention is to supply the water to a hopper or bowl in such manner as to more effectively produce the cleaning of the entire inner surface after use.

The invention consists, essentially, in a closet hopper or bowl having in its side a water-supply channel or feeder extending substantially upright on the exterior thereof and communicating with the interior thereof by a slot, which also is substantially upright in the hopper or bowl.

In the accompanying drawings, Figure 1 represents a vertical section of a hopper embodying my invention, and Fig. 2 is a horizontal section thereof upon about the plane indicated by the dotted line *x x*, Fig. 1.

Similar letters of reference designate corresponding parts in both figures.

A designates the hopper, which is not materially different in form from an ordinary hopper. It has at the top an open upper rim, *a*, to which water is not admitted, and it communicates at the bottom with the soil pipe or trap B. At the side of the hopper, and extending substantially upright thereon, is a supply channel or feeder, C, to which water is supplied by a lateral branch, C', which communicates with the upper portion thereof, as shown in Fig. 1, and this supply channel or feeder C extends substantially vertically upon the hopper, and as here shown extends the entire length thereof to its union with the trap or soil-pipe B.

The channel or feeder C is of reduced thickness toward the bottom, because of the escape of water into the hopper as it descends through it. I have shown in one side of the hopper and extending substantially vertically thereof, but a trifle off from a radial line, a slot, *a'*, through which water may pass from a supply channel or feeder C to the interior of the bowl in the direction of the arrows in Fig. 2. This slot *a'* is very narrow, and as here shown extends the entire length of the supply channel or feeder C, or, in other words, from substantially the top to bottom of the bowl in a vertical direction, and through which the water is discharged throughout the entire length of the slot in a direction which is circumferential or around the hopper, as shown by the arrows in Fig. 2. It will be seen that by the discharge of water from this slot in a sheet—which in an ordinary hopper is perhaps sixteen inches long—and in a direction circumferential of the hopper the entire inner surface of the hopper from top to bottom will be thoroughly flushed or cleaned. I have here represented the line of the slot *a'*, as shown in Fig. 2, as tangential to a circle smaller than the outlet from the hopper, and not radial, and this slot is so formed that the water escaping from the upper portion of the slot will not be thrown upward or against the seat, but will be more uniformly discharged throughout the entire length of the slot circumferentially around the surface of the hopper or bowl.

What I claim as my invention, and desire to secure by Letters Patent, is—

The closet hopper or bowl herein described, having in its side a water-supply channel or feeder extending substantially upright on the exterior thereof and communicating with the interior thereof by a slot, which also is substantially upright in the hopper or bowl, as and for the purpose herein described.

ALFRED IVERS.

Witnesses:
FREDK. HAYNES,
HENRY J. MCBRIDE.